Patented Aug. 29, 1939

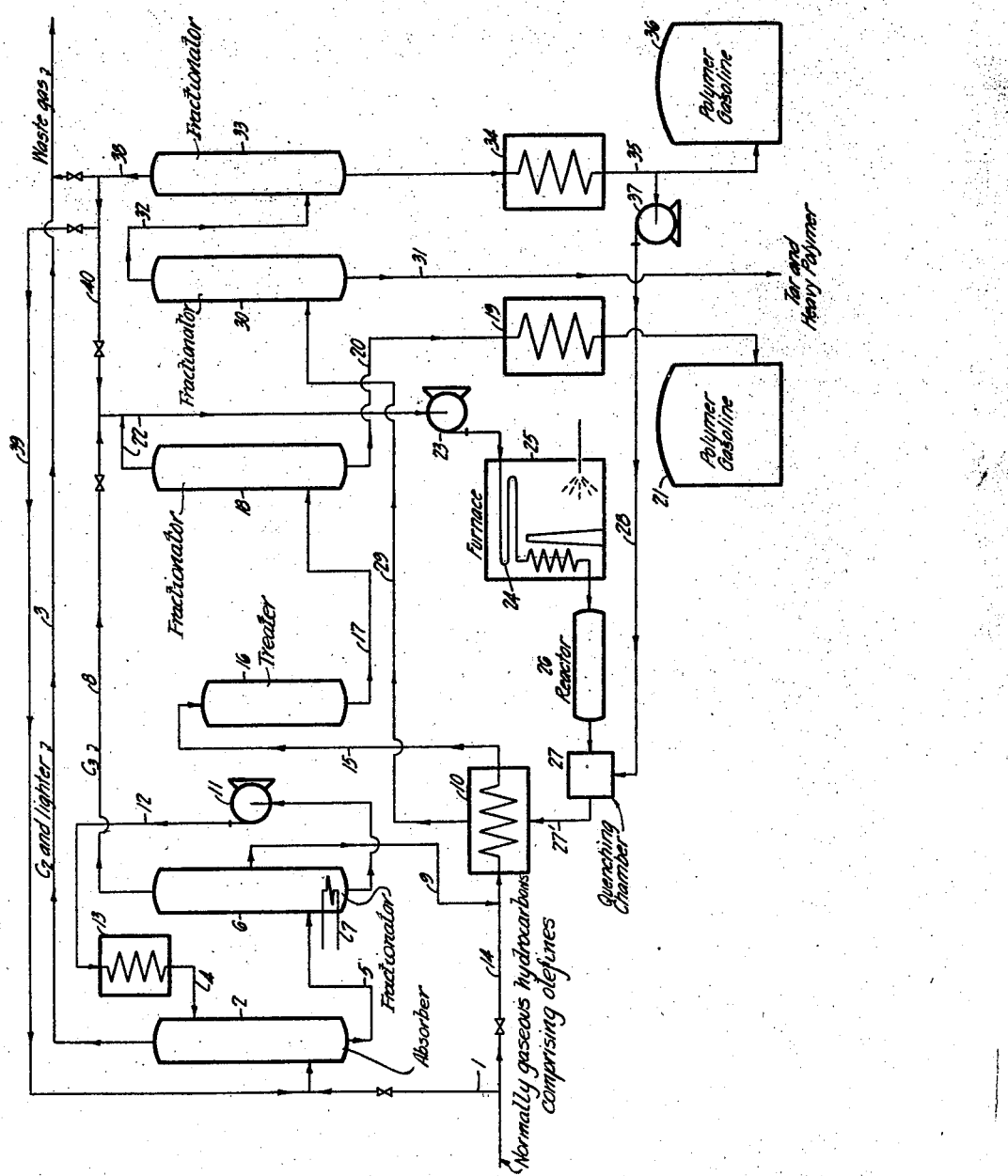

2,171,207

UNITED STATES PATENT OFFICE 2,171,207

PROCESS FOR THE POLYMERIZATION OF OLEFINS

Arthur Hallam Boultbee, Martinez, Calif., assignor to Shell Development Company, San Francisco, Calif., a corporation of Delaware Application June 19, 1936, Serial No. 86,122

6 Claims. (Cl. 196—10)

This invention relates to the manufacture of gasoline-type hydrocarbons from cracked hydrocarbon gases containing secondary and tertiary base olefins by polymerization of these olefins.

It is the purpose of this invention to provide a process whereby from normally gaseous hydrocarbons comprising olefins, a maximum yield of polymer gasoline of high octane number (A. S. T. M. method D-357-34-T) and lead susceptibility can be produced. It is another purpose to combine catalytic polymerization in the presence of a polymerization catalyst capable of converting normally gaseous olefins to gasoline-type hydrocarbons with non-catalytic polymerization in such a manner as to produce maximum yields of a gasoline a major portion of which is better than either method alone is capable of producing. Further advantages of my process are more fully explained hereinafter.

The expression "normally gaseous hydrocarbons comprising olefins" as herein defined refers to hydrocarbon mixtures comprising hydrocarbons of 5 and less carbon atoms. Mixtures to be suitable for my process must consist at least partially of 4 and/or 5 carbon secondary and tertiary base olefins and may, but need not, contain hydrocarbons of 3 and less carbon atoms, and hydrogen. The normally gaseous hydrocarbons which are used in my process may be byproducts from cracking and/or reforming of hydrocarbons, or may originate in the dehydrogenation of normally gaseous saturated hydrocarbons or may be produced by dehydration of alcohols or the removal of hydrochloric acid from suitable chlorinated hydrocarbons.

The polymerization catalyst is preferably an acid-acting catalyst. Suitable polymerization catalyst, which if solid, may be used alone or in admixture with each other, or deposited on solid carriers; or which if liquid or gaseous may be contacted or mixed with the hydrocarbons in any convenient manner or preferably may be used in the form of solid complex compounds and/or incorporated in solid carriers to form solid catalyst masses, are the mineral oxy-acids, such as the phosphoric and phosphorous acids ($H_3PO_4$, $H_4P_2O_6$, $H_4P_2O_7$, $HPO_3$, $H_4P_2O_5$, $H_3PO_3$, $H_3PO_2$) and their anhydrides, as $P_2O_5$, etc.; the acid phosphoric and phosphorous acid salts; the phosphorus oxy-halides; the sulfuric acids, arsinic acids and the like; the inorganic halides, as $AlCl_3$, $ZnCl_2$, $MgCl_2$, $FeCl_3$, $NiCl_2$, $BeCl_2$, $BF_3$, $BeF_2$, $AsF_3$, $SnCl_4$, $TiCl_4$, $PF_3$, and the like, which if desired may be used in the form of organic or inorganic complex compounds in conjunction with substances such as nitrohydrocarbons, carboxylic acids, ethers, or non-catalytic metal halides; the acid-acting salts of mineral oxy-acids as $ZnSO_4$, $CdSO_4$, $PbSO_4$, $BiOCl$, $Cd_3(PO_4)_2$, and the like. In some cases, catalytic agents of this type are advantageously employed in conjunction with a metal, as, for example, zinc, aluminum, metals of Group VIII of the periodic table, etc. Also small quantities of hydroxy compounds, such as water, alcohol, etc., may be used to activate certain of these catalysts.

The acid and acid-acting catalysts of the type herein described, particularly the phosphorus oxy-acids, may be advantageously employed as constituents of solid catalyst masses. For example, they may be deposited on or incorporated with a solid siliceous or similar absorptive material. Suitable absorptive materials are silica gel, pumice, fuller's earth, kieselguhr, Death Valley clay, bentonite, aluminum hydrosilicate, alumina, metallurgical coke, activated charcoal, and the like. Particularly good results may be obtained by employing a solid catalyst mass comprising a calcined mixture of a phosphoric acid and a siliceous material, as kieselguhr, pumice, etc.

To illustrate my process, I refer to the accompanying drawing which represents a flow diagram of one possible form of the process. Normally gaseous hydrocarbons containing olefins enter from a source not shown through line 1 into absorber 2 where they pass in countercurrent to absorption oil entering absorber 2 through line 4. A light fraction of gas consisting essentially of ethane and lighter is withdrawn through line 3 while 3-carbon hydrocarbons and heavier are dissolved in the absorption oil. If desired, the absorber 2 may be operated under such conditions that 2-carbon hydrocarbons are absorbed as well and only methane and hydrogen escape through line 3. Fat absorption oil is transferred through transfer line 5 to fractionator 6 in which the dissolved hydrocarbons are driven off by heat from reboiler 7 in the bottom of fractionator 6, and are fractionated into an intermediate fraction consisting essentially of 3-carbon or 2 and 3-carbon hydrocarbons, which leave the fractionator through overhead line 8, and a heavier fraction of 4-carbon and heavier hydrocarbons, which is transferred through line 9 to heat exchanger 10. Lean absorption oil is returned by pump 11 in line 12 through cooler 13 and line 4 to absorber 2.

If desired, the hydrocarbons in line 1 may proceed directly to heat exchanger 10 through line 14, by-passing absorber 2 and fractionator 6. The olefin containing gas in heat exchanger 10 is heated to between about 250–425° F., after which it is conducted through conduit 15 to treater 16, which treater contains a suitable solid polymerization catalyst mass. During passage through the treater, polymerization of a portion of the olefins takes place, and the polymerized mixture so produced is transferred through transfer line 17 into fractionator 18 where residual gas is separated from polymers, the polymers passing through cooler 19 in line 20 into storage tank 21 and the residual gas, containing a reduced amount of olefins is conveyed by pump 23 in line 22 through heating coil 24 located in furnace 25.

The propane-propylene fraction in line 8 originating in fractionator 6 may be combined with the residual gas in line 22 if desired. The gases in coil 24 are heated to above 900° F. and the heated gases then pass through reactor 26, in which time is allowed for the polymerization of olefins, to the quenching chamber 27. Quenching may be accomplished by admixing to the hot charge in chamber 27 the polymer gasoline produced in the process and supplied through line 28 in quantities sufficient to lower the temperature of the resulting mixture to below about 800° F. The quenched mixture then passes through line 27′ and heat exchanger 10 in indirect heat exchange relation against the incoming fresh feed, and then continues through line 29 into fractionator 30, where tar and polymers heavier than gasoline are separated from gasoline type and lighter hydrocarbons. Heavy polymers leave fractionator 30 through bottom line 31, and gasoline and lighter hydrocarbons proceed through transfer line 32 to fractionator 33. In the latter, gasoline is separated from residue gas, the gasoline going through cooler 34 in line 35 to polymer tank 36, a portion of the gasoline being diverted by pump 37 in line 28 to quenching chamber 27. The residue gas is withdrawn from fractionator 33 through line 38 and is combined with gas from the absorber 2 in line 3, the mixture to be discharged as waste gas. If desired, the residue gas in line 38 may be returned to the absorber 2 through line 39, or a portion thereof may be recycled through line 40 to join the residue gas from the catalytic polymerization step in line 22.

Normally gaseous olefins comprise ethylene, propylene, secondary and tertiary base butylenes and occasionally secondary and tertiary base amylenes. If the catalytic polymerization in the presence of a suitable solid polymerization catalyst is conducted under such conditions as to effect a selective polymerization of tertiary base olefins in preference to the remaining olefins, a gasoline is obtained which, particularly after hydrogenation, has a higher octane number and greater lead susceptibility than a similar gasoline produced under non-selective conditions.

To facilitate preferential polymerization of the tertiary base olefins, I usually begin by fractionating the olefins containing hydrocarbon gas to produce a fraction consisting essentially of hydrocarbons of four and more carbon atoms, which fraction I call for convenience the BB fraction (butane-butylene fraction) and which is a tertiary base olefin concentrate, containing substantially all of the olefins of four and more carbon atoms originally contained in the gas, and a lighter fraction comprising the hydrocarbons of less than four carbon atoms. The fractionation may be carried out in any conventional manner, such as distilling under pressure at low temperature and, if desired, in the presence of an absorption oil.

Tertiary base olefins are generally known to be more reactive than secondary base olefins and ethylene, ethylene being the only primary base olefin known. Tertiary base olefins therefore tend to be polymerized in preference to non-tertiary base olefins under a wide range of conditions. Due to the fact, however, that hydrocarbon gases of the type obtained by cracking, even after fractionation and concentration of tertiary base olefins, always contain a considerable excess of non-tertiary over tertiary base olefins, the ratio of the two usually fluctuating between about 3:1 and 3:2, it is necessary to restrict the polymerizing conditions to what I call "mild conditions," i. e., time-temperature conditions of the polymerization substantially below those at which a maximum yield of polymer gasoline is obtained, since mild conditions preferentially restrict the polymerization of non-tertiary base olefins and thus are favorable to a selective polymerization of tertiary base olefins.

Time and particularly temperature of contact with a catalyst of a given activity are the most important factors affecting polymerization. At an elevated temperature up to about 600° F. the rate of polymerization in the presence of acid-acting catalysts of the type hereinbefore described rises with increasing temperature, and with the lengthening of the time of contact the degree of polymerization increases. For every temperature below 600° F. there is a corresponding optimum time, which yields the largest amount of gasoline hydrocarbons, the optimum time-temperature combination in turn depending on the activity of the catalyst and the composition of the hydrocarbon gas. For the sake of good selectivity I control the time-temperature conditions so as to produce an amount of gasoline less than the maximum. While normally the optimum polymerization temperature in the presence of acid-active catalysts particularly of the phosphoric acid type hereinbefore described is about 450° F. or higher, I prefer to operate at a temperature between about 300–425° F. and preferably below 400° F., limiting the time of contact so that the ratio of tertiary base olefin to total olefins polymerized is not lower than about .5. Variations in pressure except insofar as they affect the time of contact for a given throughput appear to have little influence on the selectivity.

The effect of the preferential polymerization of isobutylene on the octane number of gasolines is well illustrated by the following examples, in which a BB fraction containing 30% normal butylene and 20% isobutylene was polymerized at a pressure of 600 lbs. per sq. in. by contacting with a fresh catalyst mass in which the active ingredient was a phosphoric acid.

In the table below, percent total olefins polymerized, ratios of isobutylene to normal butylene polymerized, and octane numbers of the hydrogenated polymer gasolines are compared for various throughputs at various temperatures. The throughputs is expressed in gallons liquified BB fraction per pound of catalyst per hour.

| Throughput gal./lb./hr | 4 | 7 | 4 | 4 |
|---|---|---|---|---|
| Temperature °F | 400 | 400 | 350 | 300 |
| Ratio iso-to-normal polymerized | .5 | .6 | .6 | .7 |
| Percent total polymerized | 63 | 52 | 60 | 47 |
| Octane number | 92 | 95 | 96 | 97½ |

From the above examples it appears that polymerization at a temperature of about 350° F.

yields a relatively high percentage of a very high octane number gasoline. At temperatures above 375° F. the octane number for a given yield is lower, and at lower temperatures although even higher octane number gasoline may be produced, the yields drop off sharply. Therefore, I usually prefer to carry out the catalytic polymerization at about 350° F. to 375° F. as long as the catalyst is relatively active. Upon use, the activity of the catalyst declines, and the temperature optimum then may shift toward higher temperatures, in which case I may gradually increase the polymerization temperature up to temperatures generally not exceeding 400° or 445° F., in order to counteract this decline in catalyst's activity.

Since in accordance with the above, only part of the olefins are polymerized, the residue gas from the selective polymerization of my process contains a considerable amount of olefins, which in the case of the BB fraction, consist chiefly of secondary base butylene and perhaps amylene. In order to convert these olefins to gasoline, I now subject the residue gas to a thermal polymerization process in the absence of a catalyst at a temperature above 900° F. and preferably above about 1100° F., if desired under superatmospheric pressure, under conditions which are known to give highest yields of gasoline-type hydrocarbons from normally gaseous olefins. If fractionation of the hydrocarbon gas in the manner hereinbefore described has preceded the catalytic polymerization, I may combine part or all of the untreated fraction with the residual gas from the catalytic polymerizations, so as to produce a mixture which may contain ethane, propylene, secondary base butylene, and secondary base amylene, which mixture I polymerize thermally, as described, in the absence of a catalyst.

During the thermal polymerization some polymers heavier than gasoline and tar are formed. I have observed that the amount of these higher polymers is considerably reduced if catalytic polymerization precedes the thermal polymerization. This reduction of undesirable products is probably due to the almost complete elimination of the more reactive tertiary base olefins which have a tendency to form higher polymers at the elevated thermal polymerizing temperatures.

A comparison of the quantities and qualities of the gasolines produced by the catalytic, thermal and combination processes reveals that by the catalytic polymerization not more than about 90% of the total olefins in the gas can be converted to gasoline which gasoline, after hydrogenation, has an A. S. T. M. octane number of about 90 and a high lead susceptibility. In the thermal treating process gasoline yields in excess of 100% and up to 150% of the olefin content of the gas are obtainable, the gasoline having an A. S. T. M. octane number varying from about 75 to 95, depending upon the temperature and pressures of the treatment. At relatively high temperatures higher octane number gasolines are produced, which are largely aromatic in character. Such gasolines have very low lead susceptibility, which in extreme cases may approach zero. If it is attempted to hydrogenate them for the purpose of improving lead susceptibility, octane numbers are greatly reduced because of conversion of aromatic to naphthenic hydrocarbons. In consequence, thermally produced gasolines are useful only for the blending of gasolines which require octane numbers below about 90, while catalytically manufactured gasolines may be used to produce blended gasolines having octane numbers in excess of 100 by the addition of tetra ethyl lead.

In my combination process, a total amount of gasoline can be produced which is substantially equal to that obtainable by the thermal treating process alone, and much in excess of the amount which can be produced by catalytic polymerization. About one-half of this amount of gasoline has an octane rating and lead susceptibility which is higher than that of a gasoline produced by the catalytic treatment conducted under conditions of maximum gasoline yield, or by thermal polymerization, while the other half has the properties of an ordinary thermal polymer gasoline.

If an amount of olefin containing hydrocarbon gas is divided into two portions and each portion is polymerized separately, one catalytically and the other one thermally, to produce two gasolines, the total yield thereof is smaller and the octane number and lead susceptibility of a blend of the two is lower, than if the same amount of cracked gas had been treated and polymerized by my combination process.

Depending on the nature of the catalyst used in the catalytic polymerization, the catalytically treated reaction mixture may or may not contain free mineral acid which is apt to cause serious corrosion in fractionators and other pieces of equipment through which the polymer gasoline and/or the unreacted residual gas must pass subsequently. Therefore if the catalytically treated unreacted mixture does contain corrosive acids the mixture is preferably neutralized in any convenient manner, such as by injecting ammonia, passing the mixture through solid or aqueous caustic or the like, treating with alkali suspended in oil, etc., prior to fractionating it and thermally polymerizing the residual gas as described.

I claim as my invention:

1. In the process of polymerizing normally gaseous hydrocarbons of the type produced in cracking, comprising tertiary base and non-tertiary base olefins to produce gasoline-type motor fuel, the steps of fractionating said hydrocarbons in a fractionating zone to produce a light fraction consisting essentially of ethane and lighter gases, a middle fraction consisting essentially of propane and propylene, and a heavy fraction substantially free from propane and lighter hydrocarbons comprising tertiary base and non-tertiary base olefins, contacting said heavy fraction with a polymerization catalyst capable of converting normally gaseous olefins to gasoline-type hydrocarbons, at an elevated temperature under conditions to polymerize predominantly the tertiary base olefins while only partially polymerizing the less reactive non-tertiary base olefins, thereby producing a polymer, separating the polymer from the unreacted olefins containing fraction, combining the latter with the said middle fraction, subjecting the resulting mixture to a thermal non-catalytic polymerization at a thermal polymerization temperature to produce additional polymers, separating same from residual gaseous hydrocarbons, and returning the latter to the said fractionating zone.

2. In the process of polymerizing normally gaseous hydrocarbons of the type produced in cracking, comprising tertiary base and non-tertiary base olefins to produce gasoline-type motor fuel, the steps of fractionating said hydrocarbons in a fractionating zone to produce a light fraction consisting essentially of methane and hydrogen, a middle fraction consisting essentially of two and three carbon hydrocarbons, and a heavy fraction substantially free from three carbon and lighter hydrocarbons comprising tertiary base and non-tertiary base olefins, contacting said heavy fraction with a polymerization catalyst capable of converting normally gaseous olefins to gasoline-type hydrocarbons, at an elevated temperature under conditions to polymerize predominantly the tertiary base olefins while only partially polymerizing the less reactive non-tertiary base olefins, thereby producing a polymer, separating the polymer from the unreacted olefins containing fraction, combining the latter with the said middle fraction, subjecting the resulting mixture to a non-catalytic thermal polymerization at a thermal polymerization temperature to produce additional polymers, separating same from the residual gaseous hydrocarbons, and returning the latter to the said fractionating zone.

3. The process of claim 1 in which the catalytic polymerization is carried out at a temperature below about 425° F.

4. The process of claim 1 in which the catalytic polymerization is carried out at a temperature between 300° and 425° F.

5. The process of claim 1 in which the catalyst contains a phosphoric acid as its active ingredient.

6. The process of claim 1 in which the thermal polymerization temperature is above 1100° F.

ARTHUR HALLAM BOULTBEE.